(12) United States Patent
Wu et al.

(10) Patent No.: US 8,595,180 B2
(45) Date of Patent: Nov. 26, 2013

(54) FAULT TREES METHOD OF EARLY WARNING INDICATION FOR CRITICAL INFRASTRUCTURE PROTECTION

(75) Inventors: Ching-Hui Wu, Taoyuan County (TW); Tsu-Chi Lyie, Taoyuan County (TW)

(73) Assignee: Institute of Nuclear Energy Research Atomic Energy Council, Executive Yuan, Taoyuan County (TW)

( * ) Notice: Subject to any disclaimer, the term of this patent is extended or adjusted under 35 U.S.C. 154(b) by 259 days.

(21) Appl. No.: 13/241,851

(22) Filed: Sep. 23, 2011

(65) Prior Publication Data

US 2012/0109666 A1    May 3, 2012

(30) Foreign Application Priority Data

Oct. 28, 2010    (TW) ................ 99136919 A

(51) Int. Cl.
G06F 15/18    (2006.01)
G06F 15/00    (2006.01)

(52) U.S. Cl.
USPC ........................................... 706/62

(58) Field of Classification Search
USPC ........................................... 706/62
See application file for complete search history.

(56) References Cited

U.S. PATENT DOCUMENTS

| 7,013,395 | B1 * | 3/2006 | Swiler et al. ............ 726/25 |
| 7,953,620 | B2 * | 5/2011 | Scates ............ 705/7.11 |
| 8,046,253 | B2 * | 10/2011 | Scates ............ 705/7.28 |
| 8,112,304 | B2 * | 2/2012 | Scates ............ 705/7.36 |

OTHER PUBLICATIONS

Resilience Assessment of Critical Infrastructures: From Accidental to Malicious Threats; Kaâniche, M. Dependable Computing Workshops (LADCW), 2011 Fifth Latin-American Symposium on Digital Object Identifier: 10.1109/LADCW.2011.27 Publication Year: 2011, pp. 35-36.*

* cited by examiner

Primary Examiner — Michael B Holmes
(74) Attorney, Agent, or Firm — WPAT, PC; Justin King

(57) ABSTRACT

The present invention relates to a fault trees method of early warning indication for critical infrastructure protection, which can provide a proper quantization result to be used for identifying a specific early warning indication for a critical infrastructure based upon the severity of risk assessed according to the quantification result.

3 Claims, 2 Drawing Sheets

FAULT TREES METHOD OF EARLY WARNING INDICATION FOR CRITICAL INFRASTRUCTURE PROTECTION

FIELD OF THE INVENTION

The present invention relates to a fault trees method of early warning indication for critical infrastructure protection, which can provide proper quantification result to be used for identifying a specific early warning indication for a critical infrastructure based upon the severity of risk assessed according to the quantification result.

BACKGROUND OF THE INVENTION

In order to contain all the relevant information of every scenario, the importance of scenario analysis or the transformation of early warning indication must be complicated and complex logic to determine the multiple combinations and strung into the database. In the normal state, considering the level of risk warning indication is quite complex and difficult to load. When problems arise, the increase in logic will not fully incorporated, and have to go through lengthy and time-consuming validation. Therefore, to rely on the database to show changes in risk early warning indications shall be highly dependent on the fast and powerful artificial intelligence to meet the need of solving. However, the current technology is still inadequate in this regards, analysts need to develop their own software programs to solve this problem.

Therefore, it is in need of a fault trees method of early warning indication for critical infrastructure protection.

SUMMARY OF THE INVENTION

In view of analysis model for the overall risk of national critical infrastructure, the risk may come from natural disasters or man-made hazards. The definition of risk is built in three factors, i.e. risk(R)=threat(T)×vulnerability(V)×consequence(C).

The present invention provides a fault trees method of early warning indication for critical infrastructure protection, comprising: establishing the overall risk early warning indication analysis and events input for national critical infrastructure; establishing the risk early warning indication analysis and events input for sectoral critical infrastructure; establishing the risk early warning indication analysis and events input for industrial critical infrastructure; quantifying the risk early warning indication framework of the normal state; quantifying the risk early warning indication framework of the abnormal state; and establishing a risk matrix of the risk early warning indication conversion standards.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention and wherein.

DESCRIPTION OF THE EXEMPLARY EMBODIMENTS

For your esteemed members of reviewing committee to further understand and recognize the fulfilled functions and structural characteristics of the invention, several exemplary embodiments cooperating with detailed description are presented as the follows.

Figure 1:
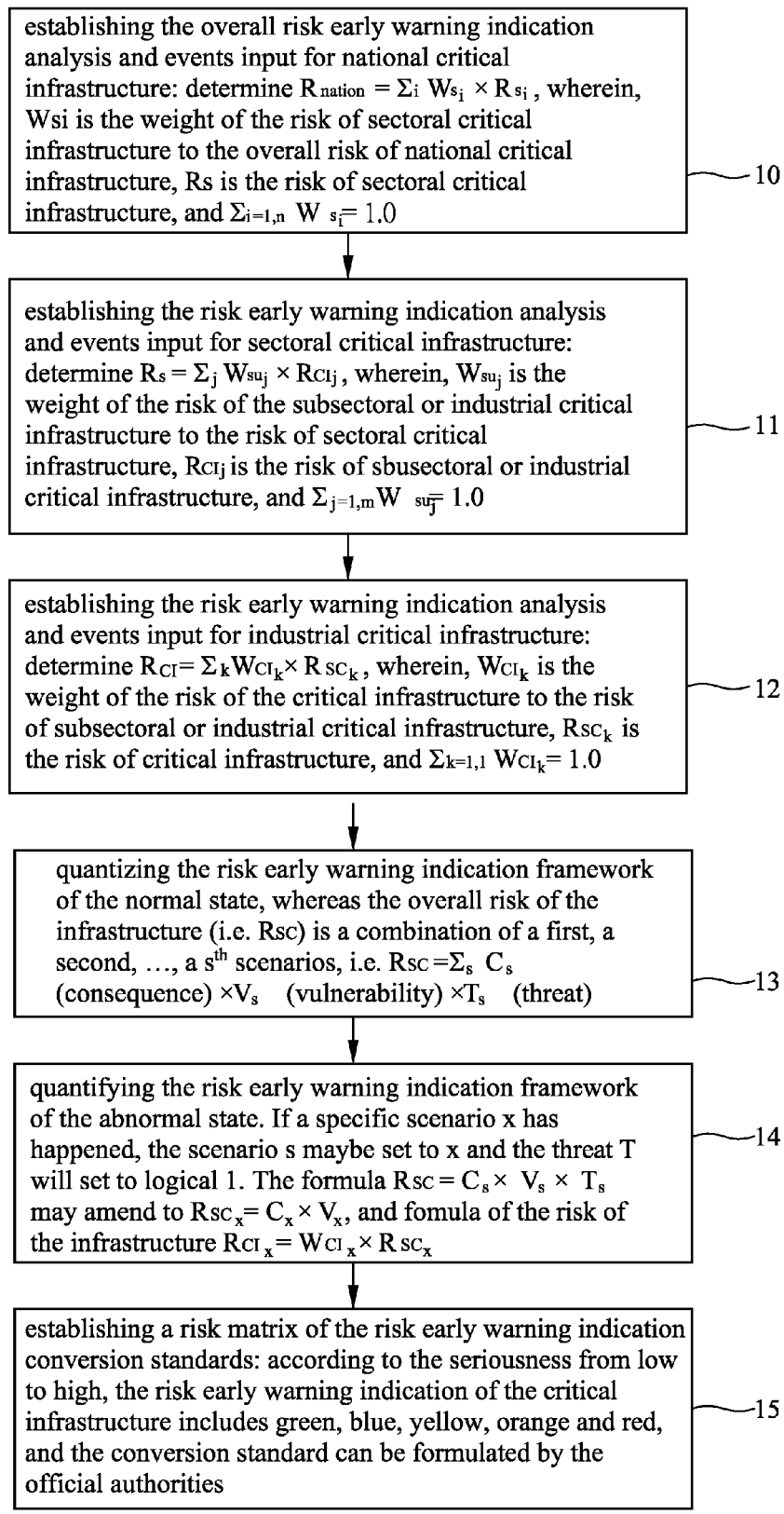
FIG. 1 is a flow chart showing a fault trees method of early warning indication for critical infrastructure protection.

Please refer to FIG. 1, which is a flow chart showing a fault trees method of early warning indication for critical infrastructure protection. As shown in FIG. 1, the step 10, establishing the overall risk early warning indication analysis and events input for national critical infrastructure. The overall risk of national critical infrastructure is a combination of i-sectoral critical infrastructure. One or more of sectoral critical infrastructure stop working or perform badly may lead to increase in the overall risk of national critical infrastructure. Considering the weight of the risk of sectoral critical infrastructure to the overall risk of national critical infrastructure, the overall risk early warning indication of national critical infrastructure can be expressed as: $R_{nation} = \Sigma_i W_{s_i} \times R_{s_i}$. Wherein, $W_{s_i}$ is the weight of the risk of sectoral critical infrastructure to the overall risk of national critical infrastructure, $R_s$ is the risk of sectoral critical infrastructure, $\Sigma_{i=1,n} W_{s_i} = 1.0$, and $W_{s_i}$ can be decided by discussion of experts.

The step 11, establishing the risk early warning indication analysis and events input for sectoral critical infrastructure. The risk of each sectoral critical infrastructure is a combination of j-subsectoral or industial critical infrastructure. One or more of subsectral or industrial critical infrastructure stop working or perform badly may lead to increase in the risk of the sectoral critical infrastructure. Considering the weight of the risk of subsectoral or industrial critical infrastructure to the risk of sectoral critical infrastructure, the risk early warning indication of sector critical infrastructure can be expressed as: $R_s = \Sigma_j W_{su_j} \times R_{CI_j}$. Wherein, $W_{su_j}$ is the weight of the risk of the subsectoral or industrial critical infrastructure to the risk of sectoral critical infrastructure, $R_{CI_j}$ is the risk of sbusectoral or industrial critical infrastructure, $\Sigma_{j=1,m} W_{su_j} = 1.0$, and $W_{su_j}$ can be decided by discussion of experts.

The step 12, establishing the risk early warning indication analysis and events input for subsectoral or industrial critical infrastructure. The risk of each subsectoral or industrial critical infrastructure is a combination of k-critical infrastructure. One or more of critical infrastructure stop working or perform badly may lead to increase in the risk of the subsectoral or industrial critical infrastructure. Considering the weight of the risk of critical infrastructure to the risk of subsectoral or industrial critical infrastructure, the risk early warning indication of subsector critical infrastructure can be expressed as: $R_{CI} = \Sigma_k W_{CI_k} \times R_{SC_k}$. Wherein, $W_{CI_k}$ is the weight of the risk of the critical infrastructure to the risk of subsectoral or industrial critical infrastructure, $R_{SC_k}$ is the risk of critical infrastructure, $\Sigma_{k=1,1} W_{CI_k} = 1.0$, and $W_{CI_k}$ can be decided by discussion of experts.

The step 13, quantifying the risk early warning indication framework of the normal state. The overall risk of the infrastructure (i.e. $R_{SC}$) is a combination of s-scenario, i.e.

$R_{SC}=\Sigma_s\ C_s$ (consequence)$\times V_s$ (vulnerability)$\times T_s$ (threat). Wherein, the consequence of the impact of the specific scenario may include the quantitative estimation (i.e. the financial loss) and the qualitative estimation (i.e. the psychological influence), the weighted quantitative value of the consequence of the scenario ($C_s$) can be determined by the quantitative value of the impact of the specific scenario divided by the sum of the quantitative value of the impact of all scenario, and similarly to the weighted qualitative value of the consequence of the scenario.

Therefore, each consequence of the scenario term ($C_1$, $C_2, \ldots, C_s$) can obtain by normalizing each consequence of the specific scenario, and the sum is 1.0. The vulnerability of the scenario means the probability of the infrastructure being damaged in the specific scenario. The incidence of the threat of the scenario is a negative correlation with the degree of the scenario.

The step 14, quantifying the risk early warning indication framework of the abnormal state. If a specific scenario x has happened, the scenario s maybe set to x and the threat $T_s$ will set to logical 1. The formula $R_{SC}=C_s\times V_s\times T_s$ may amend to $R_{SC_x}=C_x\times V_x$, and fomula of the risk of the infrastructure $R_{CIx}=W_{CIx}\times R_{SCx}$.

The step 15, establishing a risk matrix of the risk early warning indication conversion standards. According to the seriousness from low to high, the risk early warning indication of the critical infrastructure includes green, blue, yellow, orange and red. The conversion standard can be formulated by the official authorities or using the sensitivity analysis (i.e. assuming any one scenario has happened, one by one to quantify the incidence probability of the top events; assuming any two scenarios has happened, one by one to quantize the incidence probability of the top events; the rest may be deduced by analogy, until maximum number of the reasonable scenario of combination). Checking this matrix can help the official authority to formulate the risk early warning indication conversion standards.

Figure 2:
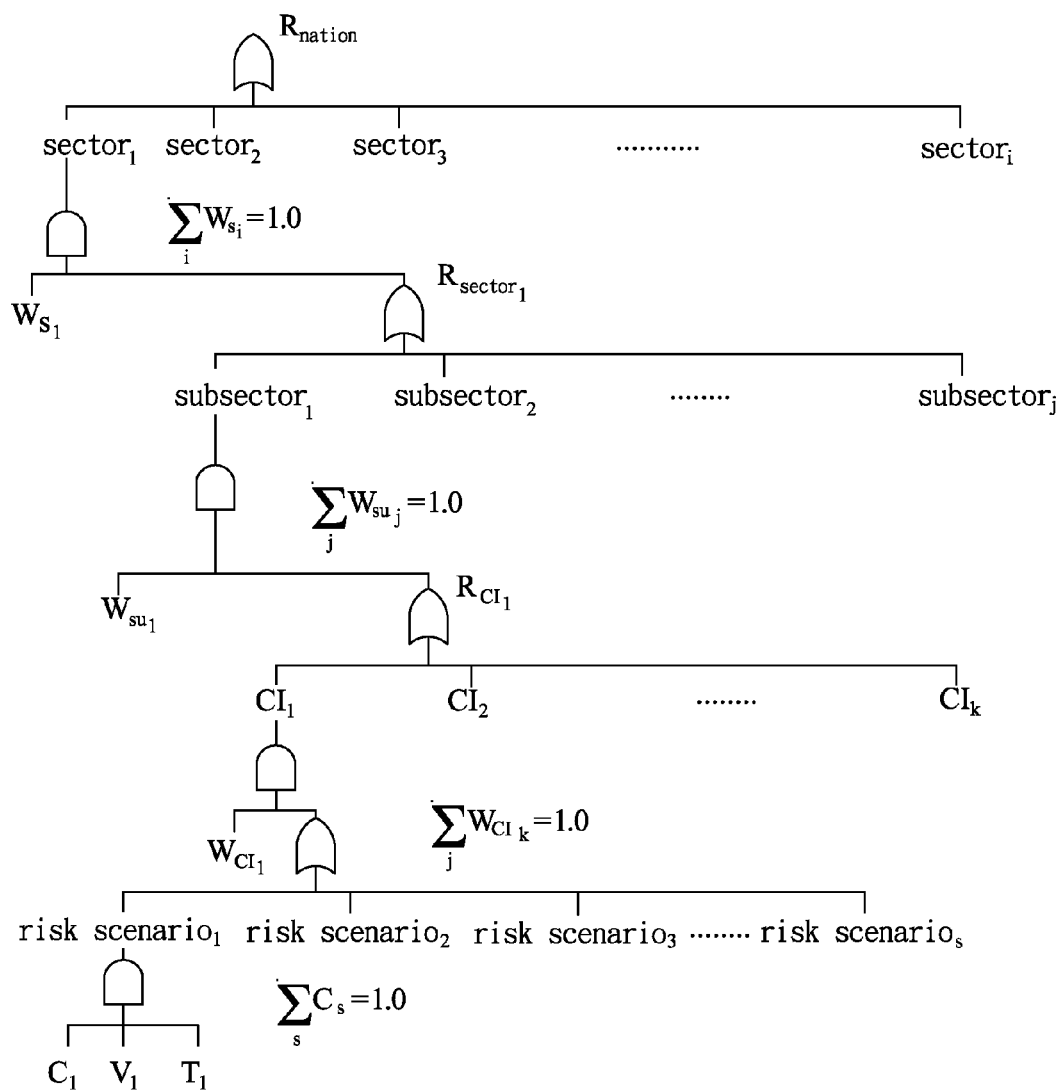
FIG. 2 is a scheme diagram showing a logic circuit which determine the result of a fault trees method of early warning indication for critical infrastructure protection.

Please refer to FIG. 2, which is a scheme diagram showing a logic gate which determine the result of a fault trees method of early warning indication for critical infrastructure protection. The logic is from top to bottom, and it is similar to a tree growing up side down. Wherein, the top gate is the root of the tree, and the events are the leaves. The connection between two different events is logic gate (i.e. AND gate, OR gate).

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

What is claimed is:

1. A fault trees method of early warning indication for critical infrastructure protection, comprising:

establishing the overall risk early warning indication analysis and events input for national critical infrastructure: determine $R_{nation}=\Sigma_i\ W_{s_i}\times R_{s_i}$, wherein, $W_{s_i}$ is the weight of the risk of sectoral critical infrastructure to the overall risk of national critical infrastructure, $R_s$ is the risk of sectoral critical infrastructure, and $\Sigma_{i=1,n}\ W_{s_i}=1.0$;

establishing the risk early warning indication analysis and events input for sectoral critical infrastructure: determine $R_s=\Sigma_j\ W_{su_j}\times R_{CI_j}$, wherein, $W_{su_j}$ is the weight of the risk of the subsectoral or industrial critical infrastructure to the risk of sectoral critical infrastructure, $R_{CI_j}$ is the risk of subsectoral or industrial critical infrastructure, and $\Sigma_{j=1,m}\ W_{su_j}=1.0$;

establishing the risk early warning indication analysis and events input for industrial critical infrastructure: determine $R_{CI}=\Sigma_k\ W_{CI_k}\times R_{SC_k}$, wherein, $W_{CI_k}$ is the weight of the risk of the critical infrastructure to the risk of subsectoral or industrial critical infrastructure, $R_{SC_k}$ is the risk of critical infrastructure, and $\Sigma_{k=1,1}\ W_{CI_k}=1.0$;

quantifying the risk early warning indication framework of the normal state: determine $R_{SC}=C_s\times V_s\times T_s$, wherein, $C_s$ can be determined by the quantitative value of the impact of the specific scenario divided by the sum of the quantitative value of the impact of all scenario, and similarly to the weighted qualitative value of the consequence of the scenario, $V_s$ means the probability of the infrastructure being damaged in the specific scenario, and $T_s$ is the incidence of the threat of the scenario is a negative correlation with the degree of the scenario;

quantizing the risk early warning indication framework of the abnormal state: amend the formula $R_{SC}=C_s\times V_s\times T_s$ to $R_{SC_x}=C_x\times V_x$, and fomula of the risk of the infrastructure amended to $R_{CIx}=W_{CIx}\times R_{SC_x}$; and establishing a risk matrix of the risk early warning indication conversion standards: according to the seriousness from low to high, the risk early warning indication of the critical infrastructure includes green, blue, yellow, orange and red, and the conversion standard can be formulated by the official authorities.

2. The fault trees method of claim 1, wherein, $W_{s_i}$, $W_{su_j}$, $W_{CI_k}$ can be decided by discussion of the experts.

3. The fault trees method of claim 1, wherein, the risk early warning indication conversion standards can be formulated by using sensitivity analysis, comprising:

assuming any one scenario has happened, quantifying the incidence probability of the top events, sequentially;

assuming any two scenarios has happened, quantifying the incidence probability of the top events, sequentially;

the rest may be deduced by analogy, until maximum number of the reasonable scenario of combination.

* * * * *